US012495774B2

(12) United States Patent
Peng et al.

(10) Patent No.: US 12,495,774 B2
(45) Date of Patent: Dec. 16, 2025

(54) DREDGED SOIL UTILIZATION-BASED ARTIFICIAL REEF STRUCTURE AND PROCESSING METHOD THEREOF

(71) Applicant: TIANJIN RESEARCH INSTITUTE FOR WATER TRANSPORT ENGINEERING, M.O.T., Tianjin (CN)

(72) Inventors: Shitao Peng, Tianjin (CN); Guoqiang Ma, Tianjin (CN); Ning Qiu, Tianjin (CN); Baocui Liang, Tianjin (CN)

(73) Assignee: TIANJIN RESEARCH INSTITUTE FOR WATER TRANSPORT ENGINEERING, M.O.T., Tianjin (CN)

( * ) Notice: Subject to any disclaimer, the term of this patent is extended or adjusted under 35 U.S.C. 154(b) by 0 days.

(21) Appl. No.: 18/686,494

(22) PCT Filed: Jul. 7, 2023

(86) PCT No.: PCT/CN2023/106398
§ 371 (c)(1),
(2) Date: Feb. 26, 2024

(87) PCT Pub. No.: WO2024/022090
PCT Pub. Date: Feb. 1, 2024

(65) Prior Publication Data
US 2025/0351806 A1 Nov. 20, 2025

(30) Foreign Application Priority Data
Jul. 28, 2022 (CN) .......................... 202210900382.8

(51) Int. Cl.
*A01K 61/73* (2017.01)
*A01K 61/75* (2017.01)

(52) U.S. Cl.
CPC .............. *A01K 61/73* (2017.01); *A01K 61/75* (2017.01)

(58) Field of Classification Search
CPC ........ A01K 61/73; A01K 61/75; A01K 61/70; E02B 3/046; E02B 17/00
See application file for complete search history.

(56) References Cited

U.S. PATENT DOCUMENTS 4,057,141 A * 11/1977 Laurie ................... B65D 85/62
206/83.5
5,207,531 A * 5/1993 Ross ........................ E02B 3/04
405/23

(Continued)

FOREIGN PATENT DOCUMENTS

| CN | 101011021 A | 8/2007 |
| CN | 104521842 A | 4/2015 |

(Continued)

OTHER PUBLICATIONS

International Search Authority (CNIPA), Search Report for PCT/CN2023/106398, Sep. 29, 2023.

(Continued)

*Primary Examiner* — Monica L Perry
(74) *Attorney, Agent, or Firm* — Zhigang Ma

(57) ABSTRACT

The present disclosure discloses a dredged soil utilization-based artificial reef structure and a processing method thereof, and belongs to the technical field of artificial reefs. The dredged soil utilization-based artificial reef structure includes a dredged soil artificial reef structure, and the dredged soil artificial reef structure includes a first dredged soil reef, a second dredged soil reef, and a third dredged soil reef; annular sliding chutes are formed in eccentric positions of upper surfaces of the first dredged soil reef and the second dredged soil reef; annular metal meshes are movably connected into the two annular sliding chutes; and a heavy block, a first floating block, and a second floating block are respectively embedded into placement slots of the three reefs in sequence. The artificial reef structure is processed by (Continued)

using dredged soil. Dredged soil resources are from the ocean and then are returned to ocean restoration, which satisfies the concept of resource recycling. Furthermore, a surface of dredged soil has multiple grooves, which is convenient for attachment of corals to achieve the purpose of ecological restoration of coral reefs, so that habitats, breeding places, and foraging places are provided for aquatic organisms such as fish to escape from natural enemies, playing an important role in the stability of an ecological system.

12 Claims, 4 Drawing Sheets

(56) References Cited

U.S. PATENT DOCUMENTS

2003/0094141 A1* 5/2003 Davis .................... A01K 61/59
                                                        119/234
2013/0125825 A1* 5/2013 Kania .................... E02B 3/046
                                                        119/221
2016/0298596 A1* 10/2016 Pereira De Gouveia Lopes De
                              Almeida ................ F03B 13/22

FOREIGN PATENT DOCUMENTS

CN        115088662        9/2022
JP        2014171447 A     9/2014

OTHER PUBLICATIONS

International Search Authority (CNIPA), Wriitem Opinion for PCT/CN2023/106398, Sep. 29, 2023.
ISR of PCT/CN2023/106398.

* cited by examiner

DREDGED SOIL UTILIZATION-BASED ARTIFICIAL REEF STRUCTURE AND PROCESSING METHOD THEREOF

TECHNICAL FIELD

The present disclosure mainly relates to the technical field of artificial reefs, and more particularly, to a dredged soil utilization-based artificial reef structure and a processing method thereof.

BACKGROUND

Coral reefs are huge reefs formed by accumulation of hermatypic corals and calcium carbonate skeletons of other organisms, and are widely distributed in tropical and subtropical shallow sea areas. The coral reefs play an important role in protection of aquatic organisms, natural shorelines, ecosystem stability, biodiversity, and other aspects. Coral reefs provide habitats, breeding places, and foraging places for aquatic organisms such as fish, and are important protected objects in marine ecological protection. For the purpose of ecological protection, various artificial reefs have been developed home and abroad, to achieve ecological restoration of coral reefs by attaching corals to the coral reefs. Currently, artificial reefs have been widely used in fields such as marine ranching and marine ecological restoration.

In the existing artificial reefs, for example, a technical structure of the application document No. CN201710195580.8 includes a concrete pillar and several concrete reefs. A cross-sectional size of the concrete pillar gradually increases from top to bottom, and a center of each concrete reef is provided with a sleeving hole that is matched with the concrete pillar in a penetrating manner. The respective concrete reefs are arranged at intervals in sequence and sleeve the concrete pillar through their respective sleeving holes. Although this device provides an attachment place for corals, a main material of a reef is a hard structure such as concrete, which has high pollution and lacks ecological friendliness. In addition, under the condition of flowing water in the ocean, a surface of a reef is relatively smooth, which cannot provide a good survival and breeding environment for planktons, so that the corals cannot be attracted to achieve the goal of ecological restoration of coral reefs.

SUMMARY

The present disclosure mainly provides a dredged soil utilization-based artificial reef structure and a processing method thereof, so as to solve the technical problems mentioned in the background section.

The technical solutions adopted in the present disclosure to solve the above technical problems are as follows:

A dredged soil utilization-based artificial reef structure includes a dredged soil artificial reef structure, wherein the dredged soil artificial reef structure includes a first dredged soil reef, a second dredged soil reef, and a third dredged soil reef; the three reefs are longitudinally stacked; several irregular breeding grooves are formed in upper surfaces and side walls of the first dredged soil reef, the second dredged soil reef, and the third dredged soil reef; annular sliding chutes are formed in eccentric positions of the upper surfaces of the first dredged soil reef and the second dredged soil reef; annular metal meshes are movably connected into the two annular sliding chutes; an opening is formed in a side wall of each annular metal mesh; placement slots are formed in circle center positions of lower surfaces of the first dredged soil reef, the second dredged soil reef, and the third dredged soil reef; and a heavy block, a first floating block, and a second floating block are respectively embedded into the placement slots of the first dredged soil reef, the second dredged soil reef, and the third dredged soil reef in sequence.

Preferably, the first dredged soil reef, the second dredged soil reef, and the third dredged soil reef are all circular-table-shaped.

Preferably, four positioning sheets are arranged at equal intervals at a rim of each placement slot in a surrounding manner; and each positioning sheet is connected to the reefs through bolts.

Preferably, seven positioning threaded holes are formed in an eccentric position of a lower surface of a first dredged soil reef; each positioning threaded hole is in meshing connection with a threaded stud; and one end of each threaded stud is meshed with a positioning thorn.

Preferably, an annular elastic limiting block is arranged at a lower edge of each annular metal mesh; and each annular elastic limiting block is slidably connected to the annular sliding chute.

Preferably, four connection threaded holes are formed in each of an edgefold portion of an upper edge of each annular metal mesh, an eccentric position of a lower surface of the second dredged soil reef, and an eccentric position of a lower surface of the third dredged soil reef, and each connection threaded hole is in meshing connection with a connection bolt.

A dredged soil utilization-based artificial reef processing method uses the dredged soil utilization-based artificial reef structure to process an artificial reef. The processing method specifically includes the following steps:

S1: first drying and grinding dredged soil, and then screening the dredged soil, wherein a drying temperature of the dredged soil is 130 to 140° C., and a size after screening is 2 to 6 mm;

S2: mixing 5 parts of the dredged soil, 2 parts of clay, one part of fine sand, and 2 parts of cement, adding water for mixing, and putting the mixture into a ball grinder for uniform mixing and grinding;

S3: putting the mixture into a homogenizer after ball grinding ends, and adding water for homogenization;

S4: putting treated clinker into a forming machine, performing compression molding using a mold, drying a molded product, and demolding the product; and S5: after demolding, conveying the product into a kiln for firing at 1200 to 1500° C. for 7 to 10 hours, naturally cooling the product for 24 hours, and obtaining a finished artificial reef.

Compared with the prior art, the present disclosure has the following beneficial effects.

(1) According to the present disclosure, due to the first dredged soil reef, the second dredged soil reef, and the third dredged soil reef, each of which is circular-table-shaped, inclined attachment surfaces can be provided for planktons. The breeding grooves are formed in the upper surfaces and inclined surfaces of the coral reeds. Under the water flowing action, it is convenient for attachment and breeding of the planktons and tiny organisms, thereby better attracting a large number of corals for gathering, foraging, and breeding, so as to achieve ecological restoration of coral reefs. The present disclosure is better applied to the fields of marine ranching and marine ecological restoration. Furthermore, under the actions of the heavy block, the first floating block, and the second floating block, after a structural body is thrown into the ocean, the three coral reefs are separated from each other, which opens the breeding grooves in the upper surfaces of the first dredged soil reef and the second dredged soil reef, and further enlarges regions of attachment and breeding of the corals, the planktons, and the tiny organisms.

(2) According to the present disclosure, the first dredged soil reef, the second dredged soil reef, and the third dredged soil reef are all processed by using dredged soil. The dredged soil resources are from the ocean and are then returned to ocean restoration, which satisfies the low-carbon concept of resource recycling. Meanwhile, the dredged soil is nontoxic and harmless. Compared with a traditional material, the dredged soil is more ecologically friendly, and can protect aquatic organism to a large extent. During processing, the clay and the firing process are introduced, which greatly improves the compressive strength and the corrosion resistance of the artificial reef and prolongs the service life of the artificial reef.

(3) According to the annular metal meshes, the annular elastic limiting blocks, the annular sliding chutes, the heavy block, the first floating block, and the second floating block, after the whole structure is thrown into the ocean, under the action of buoyancy of the floating blocks and the restraining action of the annular elastic limiting blocks, the three reefs and the two annular metal meshes are arranged in a staggered manner in a vertical direction to form a structure similar to a tower, which provides a larger living space. With many tiny mesh holes, the annular metal meshes can also reduce the acting force caused by water flowing while allowing the tiny organisms to pass, so that it is convenient for the aquatic organisms such as fish to enter the annular metal meshes through the openings for inhabitation and breeding to escape from enemies, and the annular metal meshes play an important role in aquatic organism protection, stabilities of natural shorelines and the ecological system, biological diversity, and other aspects.

The following will provide a detailed explanation and description of the present disclosure in conjunction with the accompanying drawings and specific embodiments.

Figure 1:
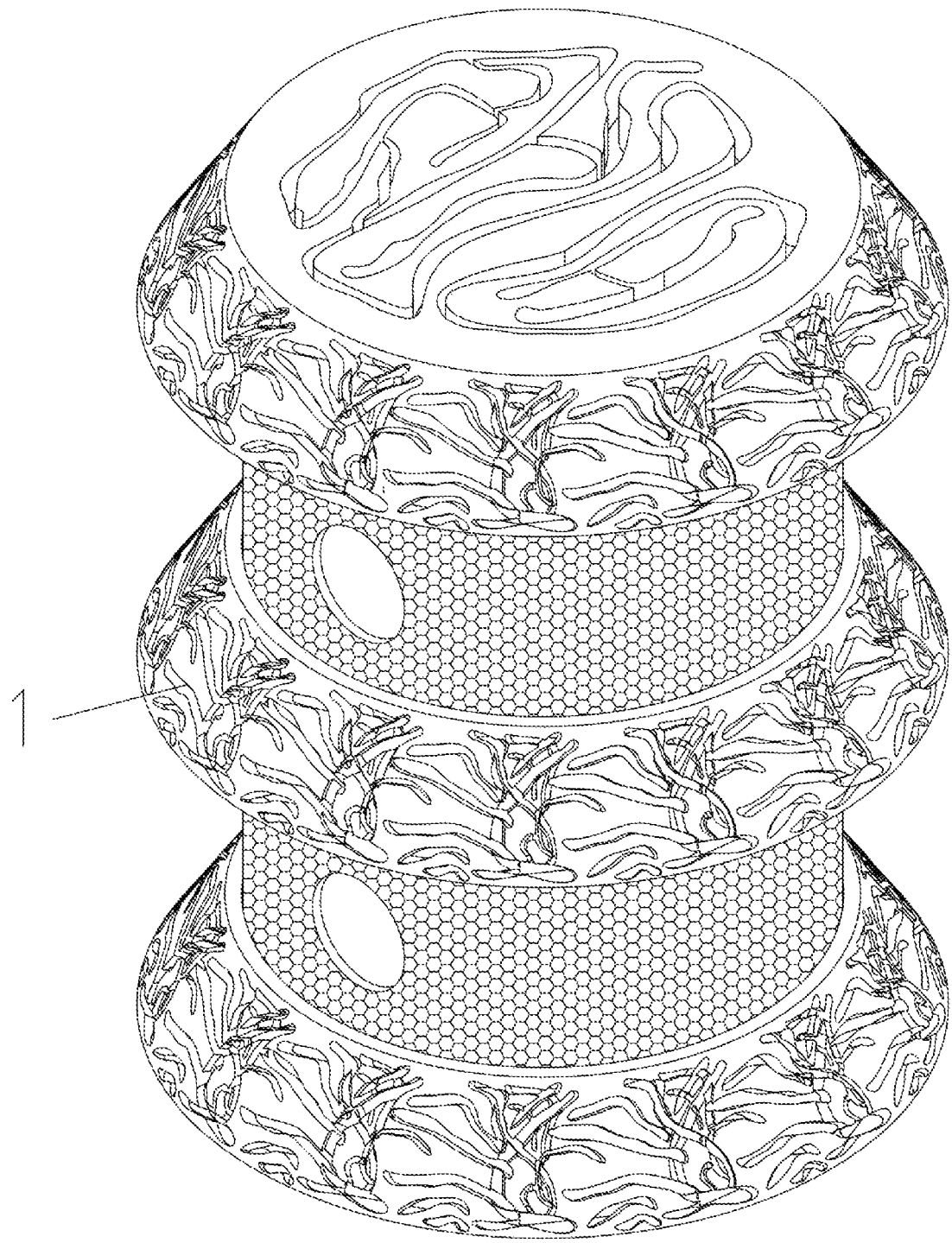
FIG. 1 is a schematic diagram of an entire structure of the present disclosure.

In the drawings: 1: dredged soil artificial reef structure; 11: first dredged soil reef; 111: breeding groove; 12: second dredged soil reef; 13: third dredged soil reef; 14: annular sliding chute; 15: annular metal mesh; 151: opening; 152: annular elastic limiting block; 153: connection threaded hole; 154: connection bolt; 16: placement slot; 17: heavy block; 171: first floating block; 172: second floating block; 18: positioning sheet; 19: positioning threaded hole; 191: threaded stud; and 192: positioning thorn.

DETAILED DESCRIPTION OF THE EMBODIMENTS

In order to facilitate the understanding of the present disclosure, the following will provide a more comprehensive description of the present disclosure with reference to the relevant drawings. The drawings provide several embodiments of the present disclosure, but the present disclosure can be implemented in different forms, not limited to the embodiments described herein. On the contrary, these embodiments are provided to make the disclosed content of the present disclosure more thorough and comprehensive.

It should be noted that when an element is considered to be "fixed to" another element, it can be directly connected to another element or there can be a centered element. When an element is considered to be "connected" to another element, it can be directly connected to another element or there may be a centered element at the same time. The terms "perpendicular", "horizontal", "left", "right", and similar expressions used herein are only for illustration purposes.

Unless otherwise defined, all technical and scientific terms used herein have the same meanings as those commonly used by those skilled in the art of the present disclosure. The terminology knowledge used in the specification of the present disclosure is for the purpose of describing the specific embodiments and is not intended to limit the present disclosure. The term "and/or" used herein includes any and all combinations of one or more related listed items.

Figure 2:
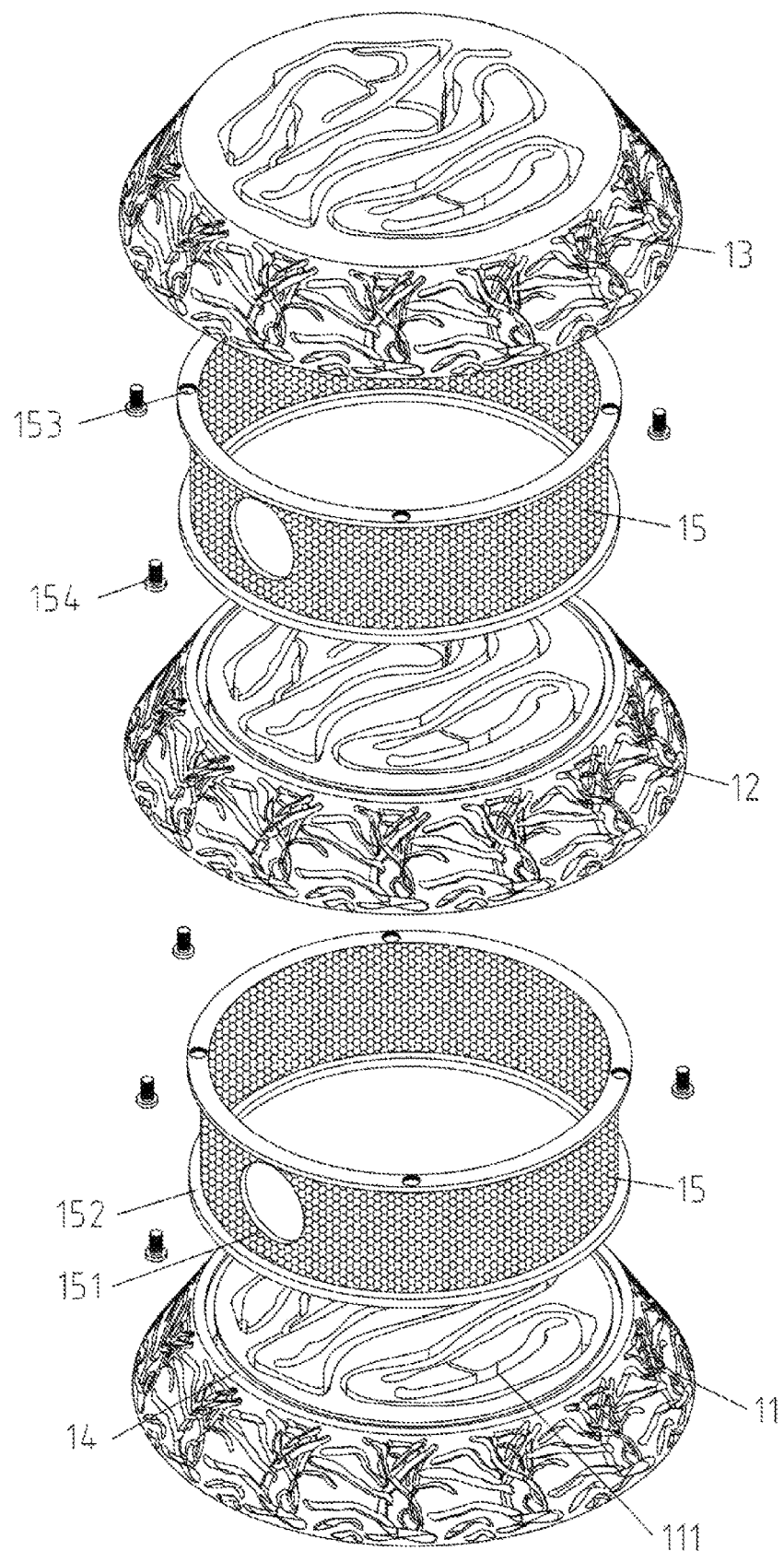
FIG. 2 is a schematic structural diagram of connection between reefs and annular metal meshes of the present disclosure.
Figure 3:
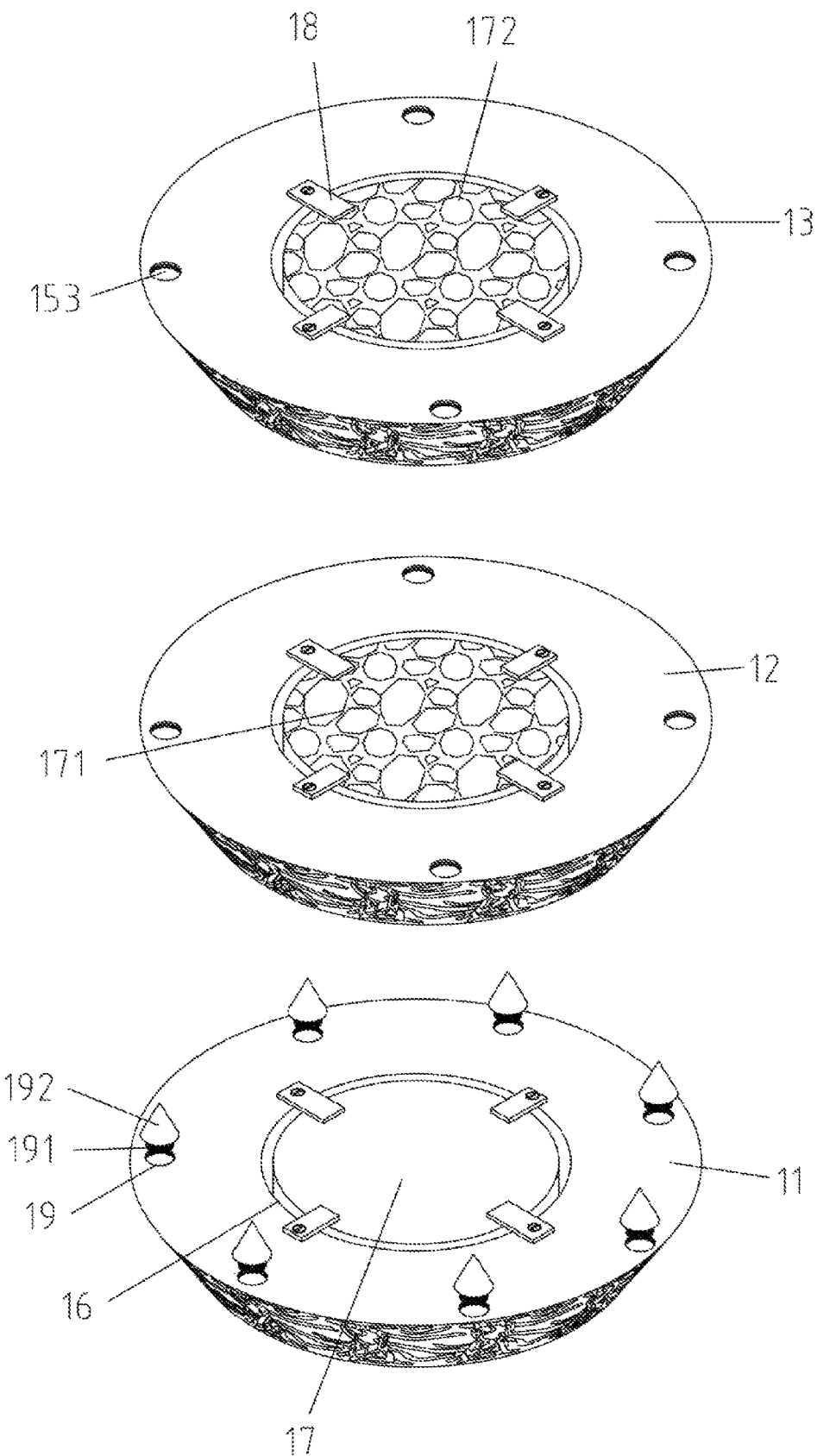
FIG. 3 is a schematic structural diagram of a bottom of a reef of the present disclosure.
Figure 4:
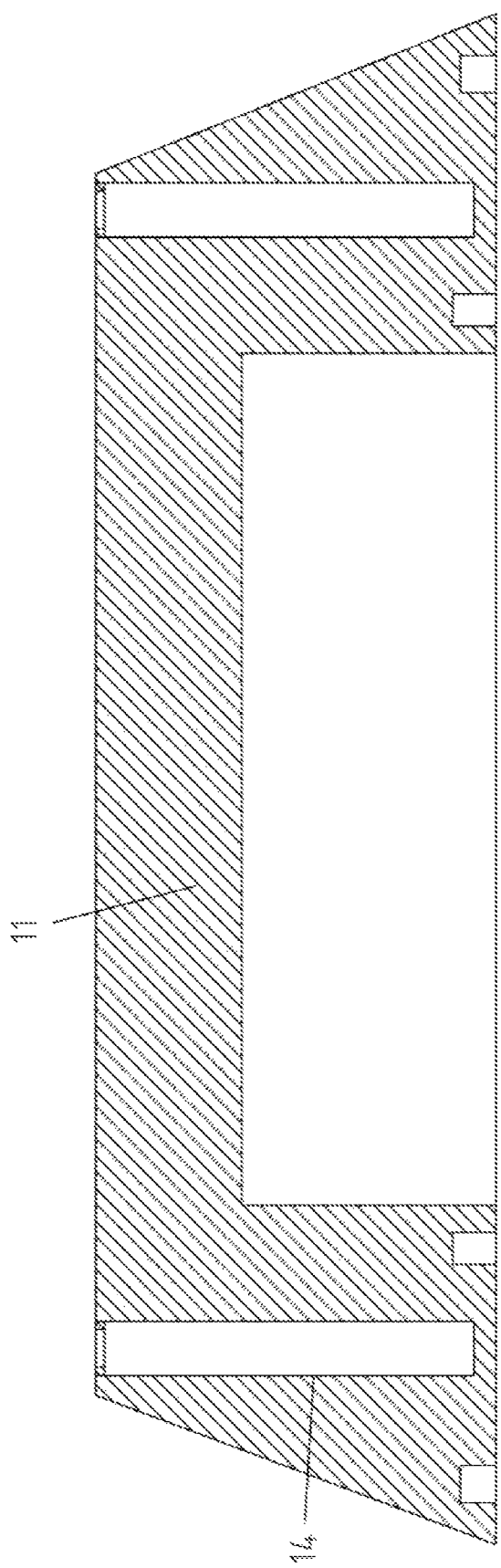
FIG. 4 is a schematic sectional diagram of a reef of the present disclosure.

First embodiment: Emphatically referring to FIG. 1 to FIG. 4, a dredged soil utilization-based artificial reef structure includes a dredged soil artificial reef structure. The dredged soil artificial reef structure 1 includes a first dredged soil reef 11, a second dredged soil reef 12, and a third dredged soil reef 13. The three reefs are longitudinally stacked. Several irregular breeding grooves 111 are formed in upper surfaces and side walls of the first dredged soil reef 11, the second dredged soil reef 12, and the third dredged soil reef 13. Annular sliding chutes 14 are formed in eccentric positions of the upper surfaces of the first dredged soil reef 11 and the second dredged soil reef 12. Annular metal meshes 15 are movably connected into the two annular sliding chutes 14. An opening 151 is formed in a side wall of each annular metal mesh 15. Placement slots 16 are formed in circle center positions of lower surfaces of the first dredged soil reef 11, the second dredged soil reef 12, and the third dredged soil reef 13. A heavy block 17, a first floating block 171, and a second floating block 172 are respectively embedded into the placement slots 16 of the first dredged soil reef 11, the second dredged soil reef 12, and the third dredged soil reef 13 in sequence.

The dredged soil artificial reef structure is processed by using dredged soil. The dredged soil resources are from the ocean and are then returned to ocean restoration, which satisfies the low-carbon concept of resource recycling. Meanwhile, the dredged soil is nontoxic and harmless. Compared with a traditional material, the dredged soil is more ecologically friendly, and can protect aquatic organism to a large extent. During processing, the clay and the firing process are introduced, which greatly improves the compressive strength and the corrosion resistance of the artificial reef and prolongs the service life of the artificial reef. A surface of the dredged soil has multiple grooves, which can provide a better living and breeding environment for planktons, thereby attracting attachment of corals to achieve the purpose of ecological restoration of coral reefs, so that a larger living space is provided. Habitats, breeding places, and foraging places are provided for aquatic organisms such as fish to escape from natural enemies, playing an important role in the stability of an ecological system, the biological diversity, and the like.

Specific operations are as follows: First, whether all the components are damaged is first detected. After it is ensured that there is no potential hazard, the heavy block 17, the first floating block 171, and the second floating block 172 are respectively placed in the placement slots 16 of the first dredged soil reef 11, the second dredged soil reef 12, and the third dredged soil reef 13. Positioning sheets 18 are then rotated, and the bolts on the positioning sheets 18 are screwed down. Later, according to the meshing relationship between connection bolts 154 and connection threaded holes 153, the two annular metal meshes 15 are mounted on lower surfaces of the second dredged soil reef 12 and the third dredged soil reef 13, and an annular elastic limiting block 152 at a lower edge of each annular metal mesh 15 is pressed into the annular sliding chute 14, so that the three reefs can be stacked together, thereby reducing the space occupation and facilitating the transportation. Threaded studs 191 on positioning thorns 192 are meshed on the positioning threaded holes 19, and the whole structure is thrown into the sea. Since the three reefs have the same sizes and weights, under the actions of the heavy block 17, the first floating block 171, and the second floating block 172, the three reefs which are originally stacked together are separated. The first dredged soil reef 11 embedded with the heavy block 17 gradually moves to the bottommost side in the falling process, so that the positioning thorns 192 are first in contact with the seabed to form a structure similar to a tower, which facilitates survival of corals, planktons, and fish.

A processing method of a dredged soil artificial reef specifically includes the following steps: S1: first drying and grinding dredged soil, and then screening the dredged soil, wherein a drying temperature of the dredged soil is 130 to 140° C., and a size after screening is 2 to 6 mm; S2: mixing 5 parts of the dredged soil, 2 parts of clay, one part of fine sand, and 2 parts of cement, adding water for mixing, and putting the mixture into a ball grinder for uniform mixing and grinding; S3: putting the mixture into a homogenizer after ball grinding ends, and adding water for homogenization; S4: putting treated clinker into a forming machine, performing compression molding using a mold, drying a molded product, and demolding the product; and S5: after demolding, conveying the product into a kiln for firing at 1200 to 1500° C. for 7 to 10 hours, naturally cooling the product for 24 hours, and obtaining a finished artificial reef.

Second embodiment: Emphatically referring to FIG. 2 and FIG. 4, an annular elastic limiting block 152 is arranged at a lower edge of each annular metal mesh 15, and each annular elastic limiting block 152 is slidably connected to the annular sliding chute 14. According to the annular elastic limiting blocks 152, when the whole structure is thrown into the ocean, disconnection and decomposition between the three reefs under the action of the buoyancy are avoided. Four connection threaded holes 153 are formed in each of an edgefold portion of an upper edge of each annular metal mesh 15, an eccentric position of a lower surface of the second dredged soil reef 12, and an eccentric position of a lower surface of the third dredged soil reef 13, and each connection threaded hole 153 is in meshing connection with a connection bolt 154. Mounting of the annular metal meshes 15 is achieved under the action of the connection threaded holes 153 and the action of the connection bolts 154.

Third embodiment: Emphatically referring to FIG. 1 and FIG. 3, the first dredged soil reef 11, the second dredged soil reef 12, and the third dredged soil reef 13 are all circular-table-shaped. Due to the circular-table-shaped reefs, inclined attachment surfaces are provided for planktons and corals. Under the water flowing action, for better attachment, four positioning sheets 18 are arranged at equal intervals at a rim of each placement slot 16 in a surrounding manner; and each positioning sheet 18 is connected to the reefs through bolts. By the positioning sheets 18, the heavy block 17, the first floating block 171, and the second floating block 172 are mounted, and are avoided from falling off from the placement slots 16. Seven positioning threaded holes 19 are formed in an eccentric position of a lower surface of a first dredged soil reef 11. Each positioning threaded hole 19 is in meshing connection with a threaded stud 191. One end of each threaded stud 191 is meshed with a positioning thorn 192. The positioning thorns 192 are conveniently pierced into soil at the seabed or into existing holes to position the whole structure.

The present disclosure has been exemplarily described above in conjunction with the accompanying drawings. Obviously, the specific implementation of the present disclosure is not limited by the above-mentioned manner. This immaterial improvement made by adopting the method concept and technical solutions of the present disclosure, or application of the concept and technical solutions of the present disclosure directly to other occasions without improvement shall all fall within the protection scope of the present disclosure.

What is claimed is:

1. A dredged soil utilization-based artificial reef structure, comprising a dredged soil artificial reef structure (1), wherein the dredged soil artificial reef structure (1) comprises a first dredged soil reef (11), a second dredged soil reef (12), and a third dredged soil reef (13); the three reefs are longitudinally stacked; several irregular breeding grooves (111) are formed in upper surfaces and side walls of the first dredged soil reef (11), the second dredged soil reef (12), and the third dredged soil reef (13); annular sliding chutes (14) are formed in eccentric positions of the upper surfaces of the first dredged soil reef (11) and the second dredged soil reef (12); annular metal meshes (15) are movably connected into the two annular sliding chutes (14); an opening (151) is formed in a side wall of each annular metal mesh (15); placement slots (16) are formed in circle center positions of lower surfaces of the first dredged soil reef (11), the second dredged soil reef (12), and the third dredged soil reef (13); and a heavy block (17), a first floating block (171), and a second floating block (172) are respectively embedded into the placement slots (16) of the first dredged soil reef (11), the second dredged soil reef (12), and the third dredged soil reef (13) in sequence.

2. The dredged soil utilization-based artificial reef structure according to claim 1, wherein the first dredged soil reef (11), the second dredged soil reef (12), and the third dredged soil reef (13) are all circular-table-shaped.

3. The dredged soil utilization-based artificial reef structure according to claim 2, wherein seven positioning threaded holes (19) are formed in an eccentric position of a lower surface of a first dredged soil reef (11); each positioning threaded hole (19) is in meshing connection with a threaded stud (191); and one end of each threaded stud (191) is meshed with a positioning thorn (192).

4. A dredged soil utilization-based artificial reef processing method, using the dredged soil utilization-based artificial reef structure according to claim 2 to process an artificial reef, wherein the processing method specifically comprises the following steps:

S1: first drying and grinding dredged soil, and then screening the dredged soil, wherein a drying temperature of the dredged soil is 130 to 140° C., and a size after screening is 2 to 6 mm;

S2: mixing 5 parts of the dredged soil, 2 parts of clay, one part of fine sand, and 2 parts of cement, adding water for mixing, and putting the mixture into a ball grinder for uniform mixing and grinding;

S3: putting the mixture into a homogenizer after ball grinding ends, and adding water for homogenization;

S4: putting treated clinker into a forming machine, performing compression molding using a mold, drying a molded product, and demolding the product; and S5: after demolding, conveying the product into a kiln for firing at 1200 to 1500° C. for 7 to 10 hours, naturally cooling the product for 24 hours, and obtaining a finished artificial reef.

5. A dredged soil utilization-based artificial reef processing method, using the dredged soil utilization-based artificial reef structure according to claim 4 to process an artificial reef, wherein the processing method specifically comprises the following steps:

S1: first drying and grinding dredged soil, and then screening the dredged soil, wherein a drying temperature of the dredged soil is 130 to 140° C., and a size after screening is 2 to 6 mm;

S2: mixing 5 parts of the dredged soil, 2 parts of clay, one part of fine sand, and 2 parts of cement, adding water for mixing, and putting the mixture into a ball grinder for uniform mixing and grinding;

S3: putting the mixture into a homogenizer after ball grinding ends, and adding water for homogenization;

S4: putting treated clinker into a forming machine, performing compression molding using a mold, drying a molded product, and demolding the product; and S5: after demolding, conveying the product into a kiln for firing at 1200 to 1500° C. for 7 to 10 hours, naturally cooling the product for 24 hours, and obtaining a finished artificial reef.

6. The dredged soil utilization-based artificial reef structure according to claim 1, wherein four positioning sheets (18) are arranged at equal intervals at a rim of each placement slot (16) in a surrounding manner; and each positioning sheet (18) is connected to the reefs through bolts.

7. A dredged soil utilization-based artificial reef processing method, using the dredged soil utilization-based artificial reef structure according to claim 3 to process an artificial reef, wherein the processing method specifically comprises the following steps:

S1: first drying and grinding dredged soil, and then screening the dredged soil, wherein a drying temperature of the dredged soil is 130 to 140° C., and a size after screening is 2 to 6 mm;

S2: mixing 5 parts of the dredged soil, 2 parts of clay, one part of fine sand, and 2 parts of cement, adding water for mixing, and putting the mixture into a ball grinder for uniform mixing and grinding;

S3: putting the mixture into a homogenizer after ball grinding ends, and adding water for homogenization;

S4: putting treated clinker into a forming machine, performing compression molding using a mold, drying a molded product, and demolding the product; and S5: after demolding, conveying the product into a kiln for firing at 1200 to 1500° C. for 7 to 10 hours, naturally cooling the product for 24 hours, and obtaining a finished artificial reef.

8. The dredged soil utilization-based artificial reef structure according to claim 1, wherein an annular elastic limiting block (152) is arranged at a lower edge of each annular metal mesh (15); and each annular elastic limiting block (152) is slidably connected to the annular sliding chute (14).

9. The dredged soil utilization-based artificial reef structure according to claim 8, wherein four connection threaded holes (153) are formed in each of an edgefold portion of an upper edge of each annular metal mesh (15), an eccentric position of a lower surface of the second dredged soil reef (12), and an eccentric position of a lower surface of the third dredged soil reef (13), and each connection threaded hole (153) is in meshing connection with a connection bolt (154).

10. A dredged soil utilization-based artificial reef processing method, using the dredged soil utilization-based artificial reef structure according to claim 6 to process an artificial reef, wherein the processing method specifically comprises the following steps:

S1: first drying and grinding dredged soil, and then screening the dredged soil, wherein a drying temperature of the dredged soil is 130 to 140° C., and a size after screening is 2 to 6 mm;

S2: mixing 5 parts of the dredged soil, 2 parts of clay, one part of fine sand, and 2 parts of cement, adding water for mixing, and putting the mixture into a ball grinder for uniform mixing and grinding;

S3: putting the mixture into a homogenizer after ball grinding ends, and adding water for homogenization;

S4: putting treated clinker into a forming machine, performing compression molding using a mold, drying a molded product, and demolding the product; and S5: after demolding, conveying the product into a kiln for firing at 1200 to 1500° C. for 7 to 10 hours, naturally cooling the product for 24 hours, and obtaining a finished artificial reef.

11. A dredged soil utilization-based artificial reef processing method, using the dredged soil utilization-based artificial reef structure according to claim 5 to process an artificial reef, wherein the processing method specifically comprises the following steps:

S1: first drying and grinding dredged soil, and then screening the dredged soil, wherein a drying temperature of the dredged soil is 130 to 140° C., and a size after screening is 2 to 6 mm;

S2: mixing 5 parts of the dredged soil, 2 parts of clay, one part of fine sand, and 2 parts of cement, adding water for mixing, and putting the mixture into a ball grinder for uniform mixing and grinding;

S3: putting the mixture into a homogenizer after ball grinding ends, and adding water for homogenization;

S4: putting treated clinker into a forming machine, performing compression molding using a mold, drying a molded product, and demolding the product; and S5: after demolding, conveying the product into a kiln for firing at 1200 to 1500° C. for 7 to 10 hours, naturally cooling the product for 24 hours, and obtaining a finished artificial reef.

12. A dredged soil utilization-based artificial reef processing method, using the dredged soil utilization-based artificial reef structure according to claim 1 to process an artificial reef, wherein the processing method specifically comprises the following steps:

S1: first drying and grinding dredged soil, and then screening the dredged soil, wherein a drying temperature of the dredged soil is 130 to 140° C., and a size after screening is 2 to 6 mm;

S2: mixing 5 parts of the dredged soil, 2 parts of clay, one part of fine sand, and 2 parts of cement, adding water for mixing, and putting the mixture into a ball grinder for uniform mixing and grinding;

S3: putting the mixture into a homogenizer after ball grinding ends, and adding water for homogenization;

S4: putting treated clinker into a forming machine, performing compression molding using a mold, drying a molded product, and demolding the product; and S5: after demolding, conveying the product into a kiln for firing at 1200 to 1500° C. for 7 to 10 hours, naturally cooling the product for 24 hours, and obtaining a finished artificial reef.

\* \* \* \* \*